United States Patent
Chen

(10) Patent No.: US 9,317,893 B2
(45) Date of Patent: Apr. 19, 2016

(54) METHODS AND SYSTEMS FOR CORRECTING A DOCUMENT IMAGE

(71) Applicant: Sharp Laboratories of America, Inc., Camas, WA (US)

(72) Inventor: Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 277 days.

(21) Appl. No.: 13/851,056

(22) Filed: Mar. 26, 2013

(65) Prior Publication Data

US 2014/0292802 A1    Oct. 2, 2014

(51) Int. Cl.
*G06T 3/00* (2006.01)
*G06K 9/34* (2006.01)
*G06K 9/36* (2006.01)

(52) U.S. Cl.
CPC ............... *G06T 3/0031* (2013.01); *G06K 9/34* (2013.01); *G06K 2009/363* (2013.01)

(58) Field of Classification Search
None
See application file for complete search history.

(56) References Cited

U.S. PATENT DOCUMENTS

| | | | |
|---|---|---|---|
| 6,885,479 B1 | 4/2005 | Pilu | |
| 6,940,664 B1 | 9/2005 | Pilu | |
| 7,330,604 B2 | 2/2008 | Wu et al. | |
| 7,576,738 B2 | 8/2009 | Litke et al. | |
| 7,586,655 B1 | 9/2009 | Uhlik et al. | |
| 7,593,595 B2 | 9/2009 | Heaney, Jr. et al. | |
| 7,623,274 B1 | 11/2009 | Lefevere | |
| 7,660,458 B1 | 2/2010 | Saric | |
| 7,697,776 B2 | 4/2010 | Wu et al. | |
| 7,835,589 B2 | 11/2010 | Heaney, Jr. et al. | |
| 7,907,171 B2 * | 3/2011 | Miyamoto et al. | 348/207.1 |
| 7,974,463 B2 | 7/2011 | Saric | |
| 8,072,654 B2 | 12/2011 | Lefevere | |
| 2004/0022451 A1 * | 2/2004 | Fujimoto et al. | 382/275 |
| 2004/0258327 A1 | 12/2004 | Cheatle et al. | |
| 2006/0267978 A1 | 11/2006 | Litke et al. | |
| 2007/0247458 A1 * | 10/2007 | Surazhsky | 345/423 |
| 2008/0285878 A1 | 11/2008 | Morichika et al. | |
| 2010/0073735 A1 | 3/2010 | Hunt et al. | |
| 2010/0239165 A1 | 9/2010 | Wu et al. | |
| 2012/0206778 A1 * | 8/2012 | Shirai et al. | 358/474 |
| 2012/0250112 A1 | 10/2012 | Ogawa et al. | |
| 2013/0268847 A1 * | 10/2013 | Kim et al. | 715/251 |
| 2014/0098142 A1 * | 4/2014 | Lee et al. | 345/676 |

FOREIGN PATENT DOCUMENTS

JP    2005045723 A    2/2005
JP    2012-170049 A    9/2012

* cited by examiner

*Primary Examiner* — Phi Hoang
*Assistant Examiner* — Diane Wills
(74) *Attorney, Agent, or Firm* — Kristine Elizabeth Matthews; David C. Ripma

(57) ABSTRACT

Aspects of the present invention relate to methods and systems for fitting a mesh to an image of a document page and correcting a distortion in the image of the document page using the mesh. A rectangular-form mesh may be overlaid on a displayed document image. Corner points in the rectangular-form mesh may be moved to coincide with corner points of a document page in the displayed document image, and a corner-aligned mesh may be overlaid on the displayed document image. A cubic Bezier curve may be fit to the top edge of the document page, a cubic Bezier curve may be fit to the bottom edge of the document page and an edge-aligned mesh may be overlaid on the displayed image. An inverse projective transformation may be applied to the patches of the mesh to correct the distortion in the image of the document page.

20 Claims, 6 Drawing Sheets

METHODS AND SYSTEMS FOR CORRECTING A DOCUMENT IMAGE

FIELD OF THE INVENTION

Embodiments of the present invention relate generally to methods and systems for image processing and, in particular, to methods and systems for correcting distortion in an image of a page in a bound publication.

BACKGROUND

Capturing a non-distorted digital image of a page in a bound publication, for example, a book, a journal and other bound publications, may be challenging due to the inability to lay the publication flat, because of the publication binding, during image acquisition. Content near the binding may become distorted due to the physical distortion of the page during image acquisition, making reading of the content difficult and making subsequent document processing, for example, optical character recognition (OCR) and other processes in a document-processing workflow, less reliable. Methods and systems for correcting for this distortion may be desirable.

SUMMARY

Some embodiments of the present invention comprise methods and systems for fitting a mesh to an image of a document page.

Some embodiments of the present invention comprise methods and systems for fitting a mesh to an image of a document page and correcting a distortion in the image of the document page using the mesh.

According to a first aspect of the present invention, a rectangular-form mesh may be overlaid on a displayed document image.

According to a second aspect of the present invention, corner points in the rectangular-form mesh may be moved to coincide with corner points of a document page in the displayed document image, and a corner-aligned mesh may be overlaid on the displayed document image.

According to a third aspect of the present invention, a cubic Bezier curve may be fit to the top edge of the document page, a cubic Bezier curve may be fit to the bottom edge of the document page and an edge-aligned mesh may be overlaid on the displayed image.

According to a fourth aspect of the present invention, an inverse projective transformation may be applied to the patches of the mesh to correct the distortion in the image of the document page.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 6:
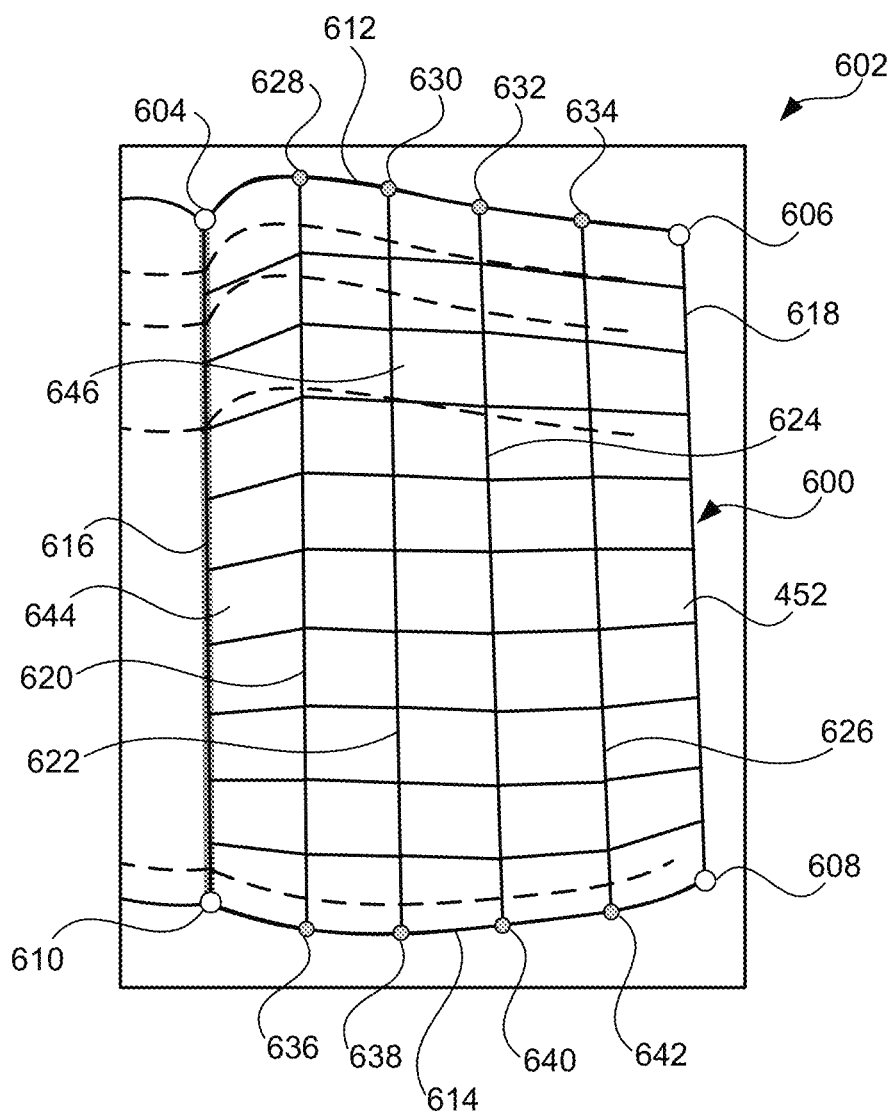
Figure 7:
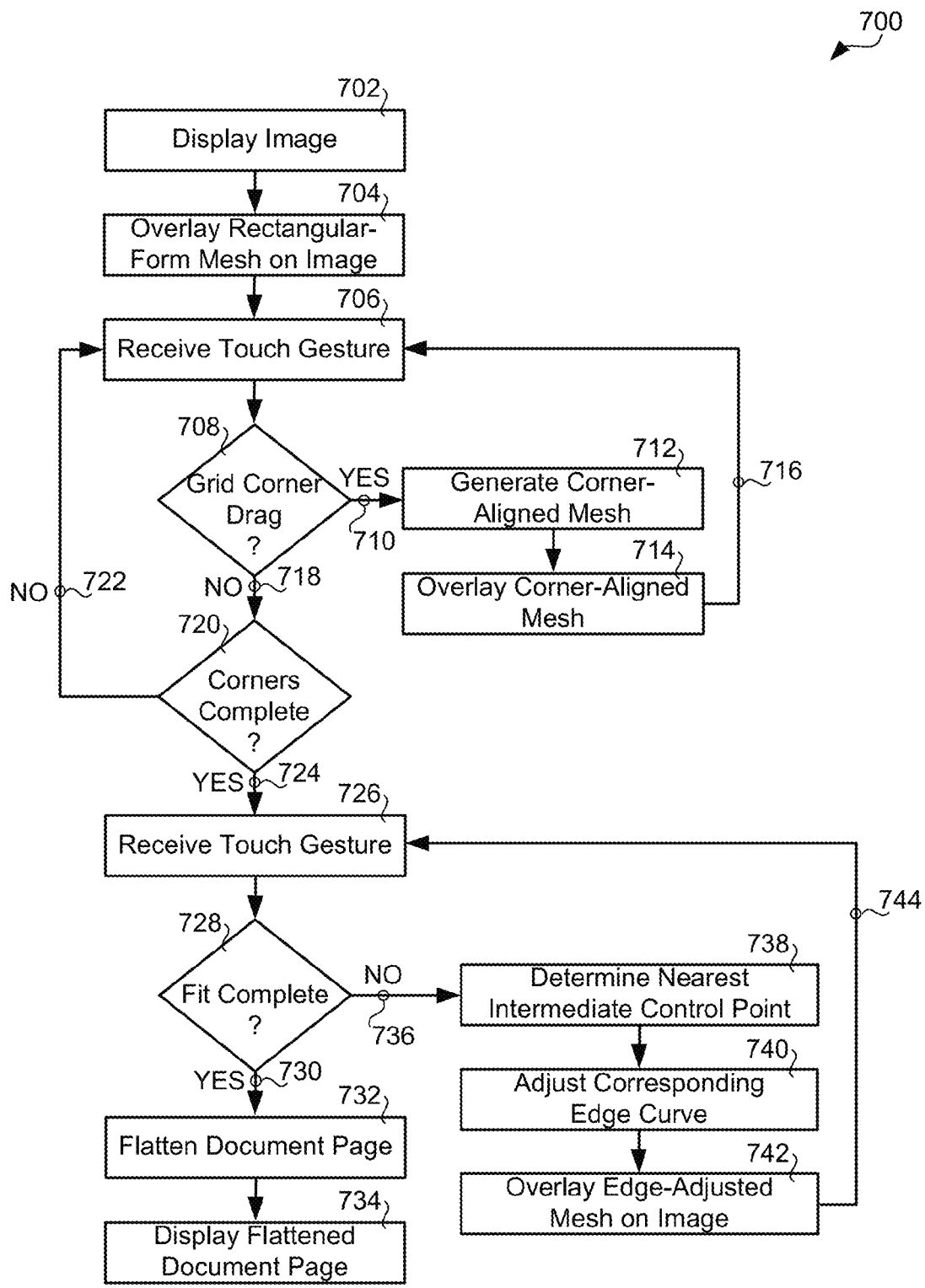

FIG. 6 is a picture illustrating an exemplary edge-aligned mesh according exemplary embodiments of the present invention; and FIG. 7 is a chart describing exemplary embodiments of the present invention comprising fitting a mesh to an image of a document page, wherein said mesh comprises a top edge comprising a first Bezier curve and a bottom edge comprising a second Bezier curve, and correcting a perspective distortion in said image using said mesh.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Capturing a non-distorted digital image of a page in a bound publication, for example, a book, a journal and other bound publications, may be challenging due to the inability to lay the publication flat, because of the publication binding, during image acquisition. Content near the binding may become distorted due to the physical distortion of the page during image acquisition, making reading of the content difficult and making subsequent document processing, for example, optical character recognition (OCR) and other processes in a document-processing workflow, less reliable. Methods and systems for correcting for this distortion may be desirable.

Figure 1:
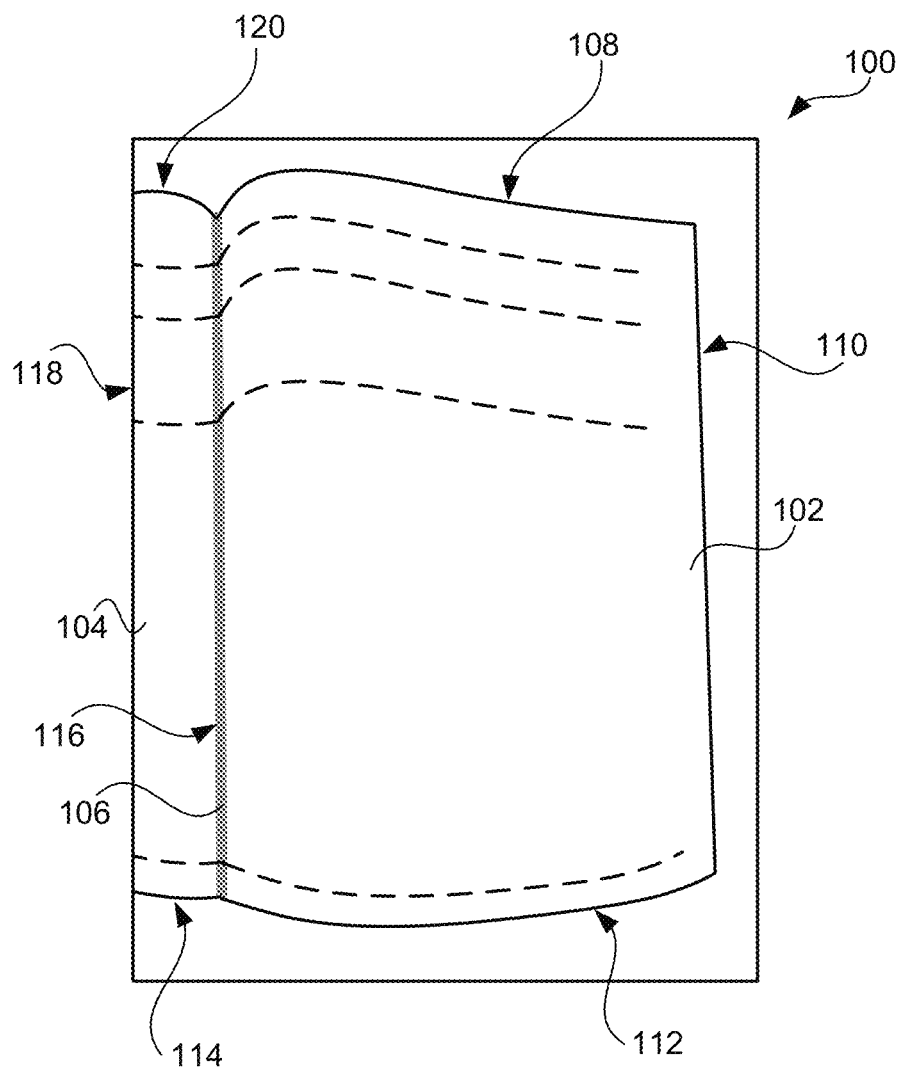
FIG. 1 is a picture illustrating an exemplary document image comprising facing pages of a bound document.

Some embodiments of the present invention may be understood in relation to FIG. 1 which illustrates an exemplary document image 100 of facing pages in a bound publication. One 102 of the facing pages, in this exemplary image 100, is imaged in its entirety. While the other 104 of the facing pages, in this exemplary image 100, is partially imaged. A region 106 whereat the two pages 102, 104 meet may correspond to the binding of the publication. Due to the physical distortion of the bound publication during image acquisition, the boundaries 108, 110, 112, 114, 116, 118, 120 of the pages 102, 104 in the image 100 may not form rectangular regions. The distorted pages 102, 104 may be referred to as curled pages. Because the curled pages 102, 104 are developable surfaces, each page 102, 104 may be modeled, according to embodiments of the present invention, by a mesh comprised of cubic Bezier curves, also referred to as Bezier curves, running in the direction of the curl and connected by straight lines running in the normal direction.

Figure 2:
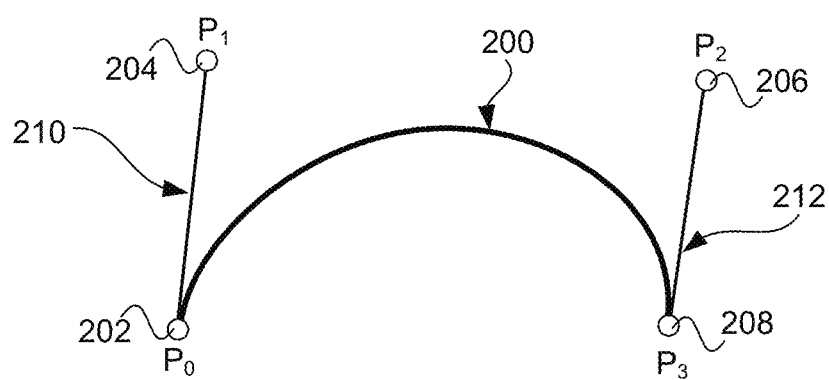
FIG. 2 is a picture illustrating an exemplary Bezier curve.
Figure 3:
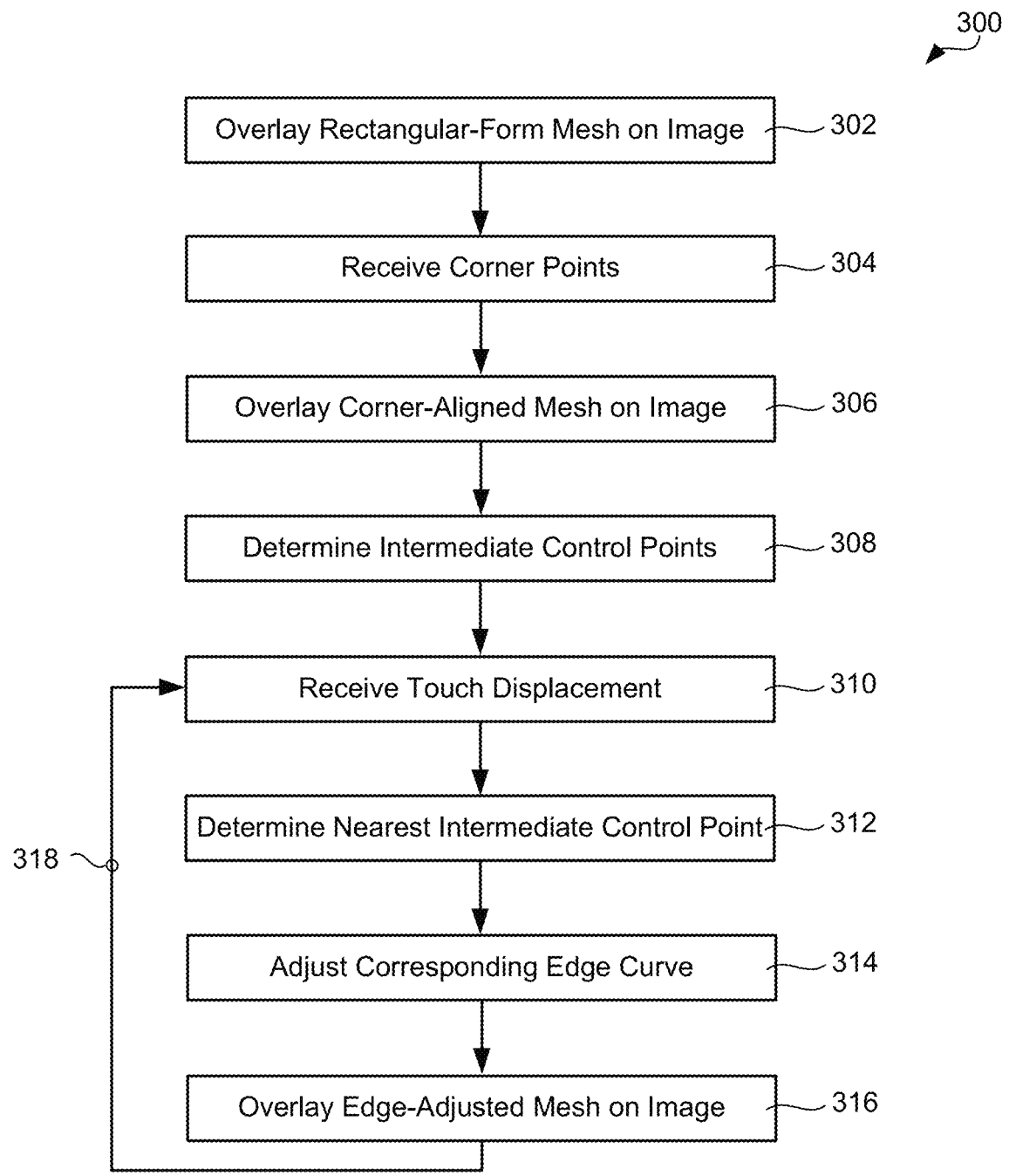
FIG. 3 is a chart describing exemplary embodiments of the present invention comprising fitting a mesh to an image of a document page, wherein said mesh comprises a top edge comprising a first Bezier curve and a bottom edge comprising a second Bezier curve.
Figure 4:
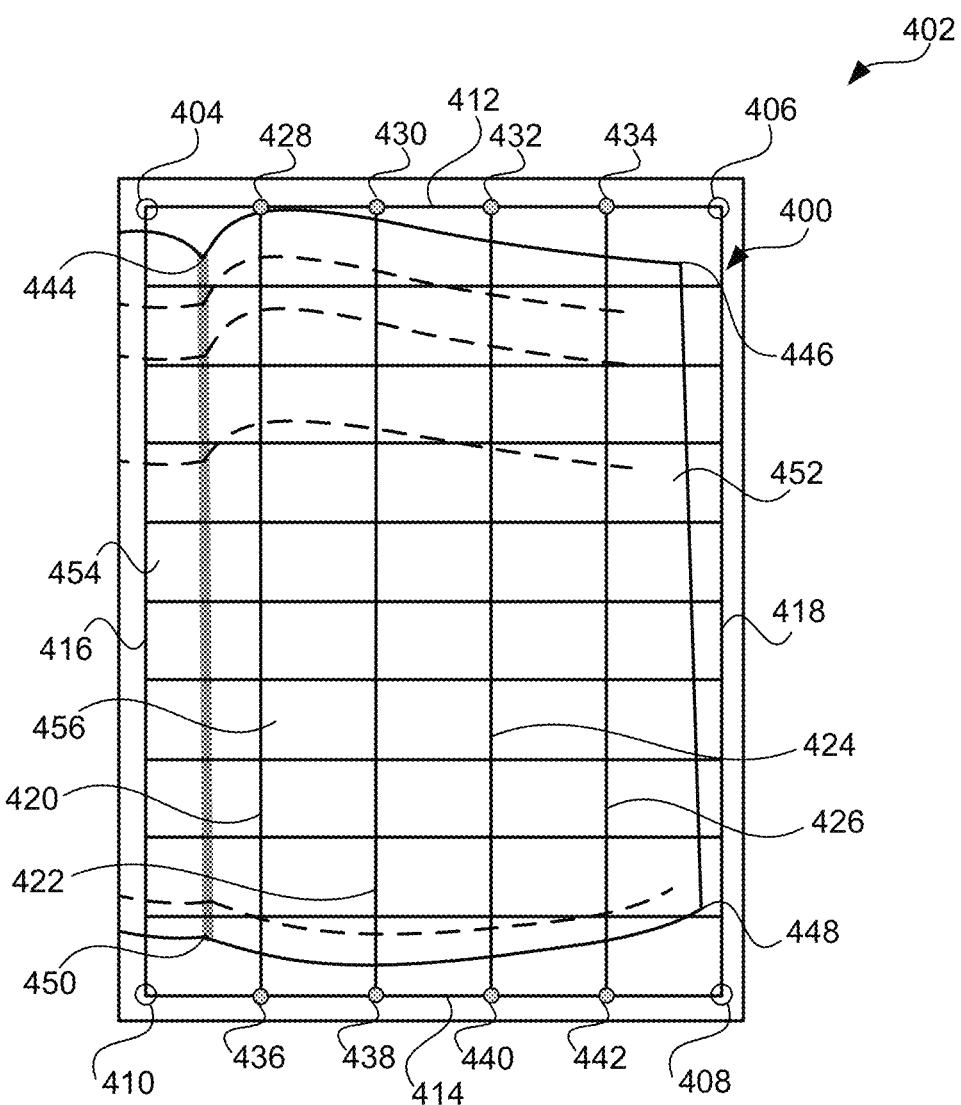
FIG. 4 is a picture illustrating an exemplary rectangular-form mesh according to exemplary embodiments of the present invention.

In some embodiments of the present invention, a top edge 108 and a bottom edge 112 of a document page 102 in a document image 100 may be modeled with a first cubic Bezier curve and a second cubic Bezier curve, respectively. A cubic Bezier curve may be understood in relation to FIG. 2. FIG. 2 depicts an exemplary cubic Bezier curve 200. A cubic Bezier curve is a parametric curve whose shape is defined by four control points, $P_0, P_1, P_2, P_3$, according to the equation:

$$B(t)=(1-t)^3 P_0+3(1-t)^2 t P_1+3(1-t)t^2 P_2+t^3 P_3, \ t\in[0,1],$$

where t is the parameter of the parametric curve and $P_0, P_1, P_2$ and $P_3$ are planar points. The parametric curve, B(t), is bounded by the convex hull of the control points departing from $P_0$, where t=0, following tangent direction $P_0P_1$, and arriving at $P_3$, where t=1, following tangent direction $P_2P_3$. $P_1$ and $P_2$ may be referred to as intermediate control points. In the exemplary Bezier curve 200 shown in FIG. 2, the four planar points $P_0$ 202, $P_1$ 204, $P_2$ 206 and $P_3$ 208 are shown in addition to the tangent lines $P_0P_1$ 210 and $P_3P_2$ 212.

Some embodiments of the present invention comprising a mesh-fitting method(s) 300 for fitting a mesh to an imaged document page may be understood in relation to FIGS. 3-6. Initially, referring to FIGS. 3 and 4, a rectangular-form mesh 400 may be overlaid 302 on a document image 402 displayed on the display of a touch-enabled device, for example, a computer, a tablet device, a mobile device and other touch-enabled devices. The rectangular-form mesh 400 may comprise four vertices: a top-left vertex 404, a top-right vertex 406, a bottom-right vertex 408 and a bottom-left vertex 410, a top edge 412 and a bottom edge 414. The top edge 412 may be connected to the bottom edge 414 by a left edge 416 between the top-left vertex 404 and bottom-left vertex 410. The top edge 412 may be connected to the bottom edge 414 by a right edge 418 between the top-right vertex 406 and bottom-right vertex 408. A plurality of lines (four shown 420, 422, 424, 426) may connect equal-spaced points 428, 430, 432, 434 along the top edge 412 with corresponding equal-spaced points 436, 438, 440, 442 along the bottom edge 414. Patches, for example, two labeled 454, 456, within the rectangular-form mesh 400, may be formed by connecting equal-spaced points along adjacent vertical lines in the rectangular-form mesh 400. In some embodiments of the present invention, each of six vertical lines within the rectangular-form mesh 400 may be divided into ten segments, thereby generating fifty patches.

A user may move, also considered drag, via touch, mouse, digital-pen device or other interface device, the corners 404, 406, 408, 410 of the rectangular-form mesh 400 to coincide with the corners 444, 446, 448, 450 of a document page 452 in the document image 402, and the coincident corner points may be received 304 in the mesh-fitting method 300.

Figure 5:
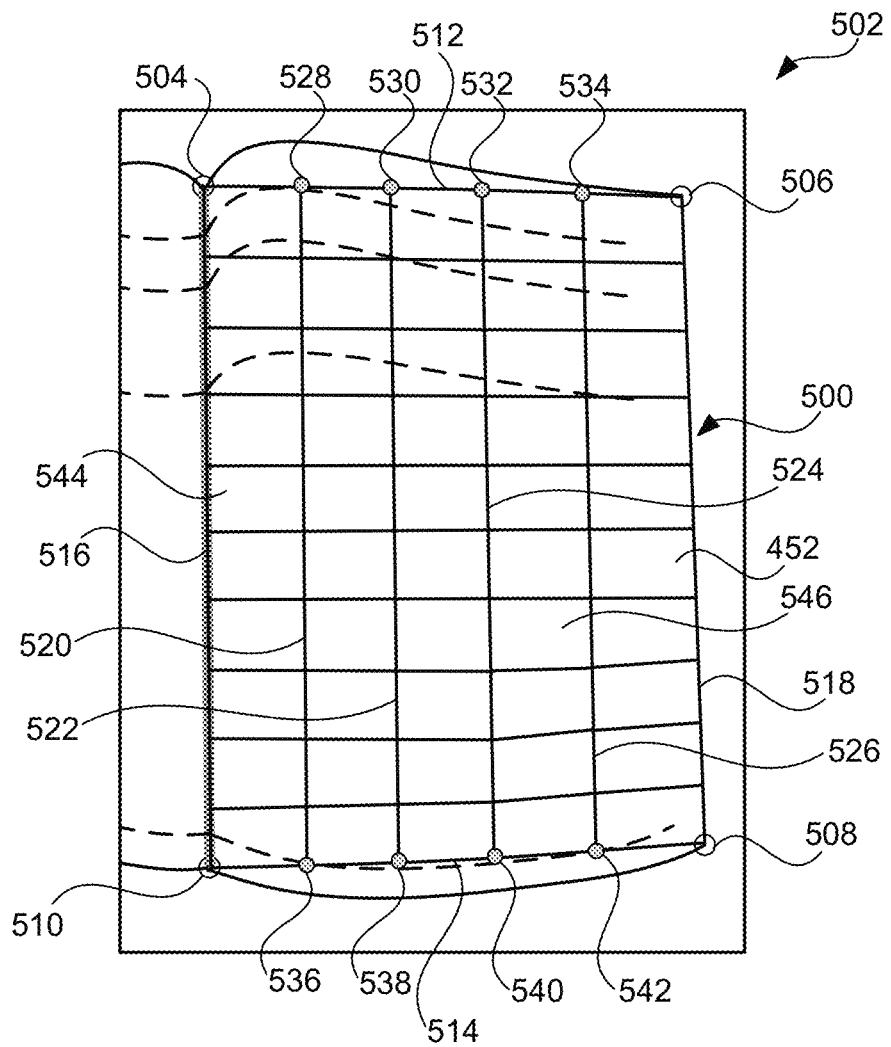
FIG. 5 is a picture illustrating an exemplary corner-aligned mesh according to exemplary embodiments of the present invention.

Referring to FIG. 5, a corner-aligned mesh 500 may be overlaid, also considered superimposed, 306 on the document image 502. The corner-aligned mesh 500 may comprise four vertices: a top-left vertex 504 corresponding to the top-left corner 444 of the document page 452, a top-right vertex 506 corresponding to the top-right corner 446 of the document page 452, a bottom-right vertex 508 corresponding to the bottom-right corner 448 of the document page 452 and a bottom-left vertex 510 corresponding to the bottom-left corner 450 of the document page 452, a top edge 512 and a bottom edge 514. The top edge 512 may be connected to the bottom edge 514 by a left edge 516 between the top-left vertex 504 and bottom-left vertex 510. The top edge 512 may be connected to the bottom edge 514 by a right edge 518 between the top-right vertex 506 and bottom-right vertex 508. A plurality of lines (four shown 520, 522, 524, 526) may connect equal-spaced points 528, 430, 532, 534 along the top edge 512 with corresponding equal-spaced points 536, 538, 540, 542 along the bottom edge 514. Patches, for example, two labeled 544, 546, within the corner-aligned mesh 500, may be formed by connecting equal-spaced points along adjacent vertical lines in the corner-aligned mesh 500. In some embodiments of the present invention, each of six vertical lines within the corner-aligned mesh 500 may be divided into ten segments, thereby generating fifty patches. The displayed rectangular-form mesh may be removed from the display when the corner-aligned mesh is overlaid.

Intermediate control points may be determined 308 for a first cubic Bezier curve corresponding to the top edge 512 and for a second cubic Bezier curve corresponding to the bottom edge 514.

In some embodiments of the present invention, a dragging action of a corner point may effectuate a continuously redrawn mesh in response to the dragging action. In these embodiments, an intermediate corner-aligned mesh, corresponding to a corner movement, may be generated and displayed.

A touch displacement may be received 310 in the mesh-fitting method 300. The touch displacement may be effectuated by a finger touch, a mouse action, a digital-pen device or other interface method. A touch displacement may correspond to a user touch gesture commencing at an initial touch point and terminating at a final touch point. A nearest intermediate control point to the initial touch point may be determined 312, and the mesh edge, top edge or bottom edge, associated with the nearest intermediate control point may be adjusted 314 accordingly by moving the nearest intermediate control point a displacement commensurate with the received touch displacement. For example, a received touch displacement of a first length in a first direction may be applied to the nearest intermediate control point.

Referring to FIG. 6, an edge-aligned mesh 600 may be overlaid 316 on the document image 602. The edge-aligned mesh 600 may comprise four vertices: a top-left vertex 604 corresponding to the top-left corner 444 of the document page 452, a top-right vertex 606 corresponding to the top-right corner 446 of the document page 452, a bottom-right vertex 608 corresponding to the bottom-right corner 448 of the document page 452 and a bottom-left vertex 610 corresponding to the bottom-left corner 450 of the document page 452, a top, cubic Bezier curve edge 612 and a bottom cubic Bezier curve edge 614. The top edge 612 may be connected to the bottom edge 614 by a left edge 616 between the top-left vertex 604 and bottom-left vertex 610. The top edge 612 may be connected to the bottom edge 614 by a right edge 618 between the top-right vertex 606 and bottom-right vertex 608. A plurality of lines (four shown 620, 622, 624, 626) may connect equal-t-parameter-spaced points 628, 630, 632, 634 along the top edge 612 with corresponding equal-t-parameter spaced points 636, 638, 640, 642 along the bottom edge 614. In some embodiments of the present invention t-parameter values of 0.2, 0.4, 0.6 and 0.8 correspond to the four lines 620, 622, 624, 626, respectively. Patches, for example, two labeled 644, 646, within the edge-aligned mesh 600, may be formed by connecting equal-spaced points along adjacent vertical lines in the edge-aligned mesh 600. In some embodiments of the present invention, each of six vertical lines within the edge-aligned mesh 600 may be divided into ten segments, thereby generating fifty patches. The displayed corner-aligned mesh may be removed from the display when the edge-aligned mesh is overlaid.

In some embodiments of the present invention, a dragging action associated with a touch displacement may effectuate a continuously re-drawn mesh in response to the dragging action. In these embodiments, an intermediate edge-aligned mesh, corresponding to a touch displacement movement, may be generated and displayed.

The mesh-fitting method 300 may continue 318 receiving touch displacements 310 and displaying an updated edge-adjusted mesh.

Some embodiments of the present invention may be described in relation to FIG. 7. FIG. 7 is a chart describing method(s) 700 for correcting distortion in an image of a page in a bound publication.

A document image may be displayed 702 on the display of a touch-enabled device, for example, a computer, a tablet device, a mobile device and other touch-enabled devices.

A rectangular-form mesh may be overlaid 704 on the document image displayed on the touch-enabled-device display. The rectangular-form mesh may comprise four vertices, also considered corners: a top-left vertex, a top-right vertex, a bottom-right vertex and a bottom-left vertex, a top edge and a bottom edge. The top edge may be connected to the bottom edge by a left edge between the top-left vertex and bottom-left vertex. The top edge may be connected to the bottom edge by a right edge between the top-right vertex and bottom-right vertex. A plurality of lines may connect equal-spaced points along the top edge with corresponding equal-spaced points along the bottom edge. In some embodiments of the present invention, four lines, in addition to the left edge and the right edge, may connect the equal-spaced points along the top edge with the corresponding equal-spaced points along the bottom edge. Patches, within the rectangular-form mesh, may be formed by connecting equal-spaced points along adjacent vertical lines in the rectangular-form mesh. In some embodiments of the present invention, each of six vertical lines within the rectangular-form mesh may be divided into ten segments, thereby generating fifty patches.

A touch gesture may be received 706. In some embodiments of the present invention, the touch gesture may be received in a gesture processor resident in the touch-enabled device.

The received touch gesture may be examined 708 to determine if the received touch gesture is a drag gesture associated with a corner of the rectangular-form mesh. The drag gesture may be associated with an initial gesture point at which the drag gesture commences and a final gesture point at which the drag gesture terminates. In some embodiments, a drag gesture may be associated with a corner of the rectangular-form mesh if the drag gesture is initiated with a region proximal to a corner of the rectangular-form mesh.

If the received touch gesture is determined to be a drag gesture associated with a corner of the rectangular-form mesh 710, then a corner-aligned mesh may be generated 712. The corner-aligned mesh may be an adjusted form of the rectangular-form mesh, wherein the adjusted form of the rectangular-form mesh replaces the corner of the rectangular-form mesh proximal to the initial gesture point with the final gesture point and appropriately adjusts the corresponding edge, the left edge, the right edge and the plurality of lines connecting equal-spaced points between the adjusted corresponding edge and the other, original edge.

The corner-aligned mesh may be overlaid 714 on the document image. The previously overlaid mesh may be removed when the most recently generated mesh is overlaid.

The method 700 may wait 716 to receive additional touch gestures.

If the received touch gesture is determined not to be a drag gesture associated with a corner of the rectangular-form mesh 718, then the touch gesture may be examined 720 to determine if it is a touch gesture indicative that all of the vertices in the currently overlaid mesh are associated with document page corners. In some embodiments, a touch gesture indicative that all of the vertices in the current mesh are associated with document page corners may comprise a double-tap touch gesture. In alternative embodiments, a touch gesture indicative that all of the vertices in the current mesh are associated with document page corners may comprise a touch gesture associated with a menu item corresponding to completion of corner selection.

If corner selection is not complete 722, then the method 700 may wait 722 to receive 706 additional touch gestures in a grid-corner-drag loop.

If corner selection is complete 724, then the method 700 may wait to receive a touch gesture 726 in an mesh-fit-complete loop. When a touch gesture is received 726, then the touch gesture may be examined 728 to determine if the mesh-fit process is complete. In some embodiments, a touch gesture indicative that the mesh-fit process is complete may comprise a double-tap touch gesture. In alternative embodiments, a touch gesture indicative that the mesh-fit process is complete may comprise a touch gesture associated with a menu item corresponding to completion of mesh fitting.

If the received touch gesture is determined to indicate that the mesh-fit process is complete 730, then the image region within the final fitted mesh may be transformed to correct for the projective distortion in the image. In some embodiments of the present invention, an inverse projective transformation may be applied in a strip-by-strip fashion along a ruled direction within the finally determined mesh. In alternative embodiments of the present invention, an inverse projective transformation may be applied in a patch-by-patch fashion within the finally determined mesh.

In some embodiments of the present invention, a patch within the finally determined mesh whereat the surface curvature is high may be subdivided to create smaller patches.

The flattened document page may be displayed 734.

If the received touch gesture is determined to indicate that the mesh-fit process is not complete 736, then the nearest intermediate control point may be determined 738, and the touch gesture may be interpreted as a touch displacement corresponding to a user touch gesture commencing at an initial touch point and terminating at a final touch point. The edge curve, top edge or bottom edge, associated with the nearest intermediate control point may be adjusted 740 accordingly by moving the nearest intermediate control point a displacement commensurate with the received touch displacement. For example, a received touch displacement of a first length in a first direction may be applied to the nearest intermediate control point.

An edge-aligned mesh may be overlaid 742 on the document image. The edge-aligned mesh may comprise four vertices: a top-left vertex corresponding to the top-left corner of the document page, a top-right vertex corresponding to the top-right corner of the document page, a bottom-right vertex corresponding to the bottom-right corner of the document page and a bottom-left vertex corresponding to the bottom-left corner of the document page, a top, cubic Bezier curve edge and a bottom cubic Bezier curve edge. The top edge may be connected to the bottom edge by a left edge between the top-left vertex and bottom-left vertex. The top edge may be connected to the bottom edge by a right edge between the top-right vertex and bottom-right vertex. A plurality of lines may connect equal-t-parameter-spaced points along the top edge 612 with corresponding equal-t-parameter spaced points along the bottom edge. In some embodiments of the present invention t-parameter values of 0.2, 0.4, 0.6 and 0.8 correspond to four lines, respectively. Patches, within the edge-aligned mesh, may be formed by connecting equal-spaced points along adjacent vertical lines in the edge-aligned mesh. In some embodiments of the present invention, each of six vertical lines within the edge-aligned mesh may be divided into ten segments, thereby generating fifty patches. A previously displayed mesh may be removed from the display when the currently generated mesh is overlaid.

In some embodiments of the present invention, a dragging action associated with a touch displacement may effectuate a continuously re-drawn mesh in response to the dragging action. In these embodiments, an intermediate edge-aligned mesh, corresponding to a touch displacement movement, may be generated and displayed.

The mesh-fitting method may continue receiving touch displacements and displaying an updated edge-adjusted mesh.

The method 700 may wait 744 to receive 726 additional touch gestures in a mesh-fit-complete loop.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for generating a corrected document image of an image of a document page, said method comprising:
   displaying a document image on a touch-enabled-device display;
   overlaying a rectangular-form mesh on said displayed document image;
   receiving a plurality of corner points;
   overlaying a corner-aligned mesh on said displayed document image;
   receiving a touch displacement comprising an initial touch point and a final touch point;
   determining a nearest intermediate control point, wherein said nearest intermediate control point is an intermediate control point of an associated cubic Bezier curve, to said initial touch point;
   adjusting an edge curve associated with said nearest intermediate control point based on said touch displacement;
   generating an edge-aligned mesh based on said adjusted edge curve;
   correcting a portion of said image of said document page corresponding to said edge-aligned mesh; and
   generating a corrected document image, wherein said corrected document image comprises said corrected portion.

2. A method as described in claim 1, wherein said corner-aligned mesh comprises a top edge and a bottom edge, wherein said top edge is a first cubic Bezier curve and said bottom edge is a second cubic Bezier curve.

3. A method as described in claim 2, wherein said edge curve is associated with one of said top edge and said bottom edge.

4. A method as described in claim 1, wherein receiving a first corner point in said plurality of corner points comprises:
   receiving a touch gesture in a gesture processor; and
   determining if said touch gesture is a drag gesture associated with a corner of said rectangular-form mesh.

5. A method as described in claim 4, wherein said determining if said touch gesture is a drag gesture associated with a corner of said rectangular-form mesh comprises comparing an initial point associated with said touch gesture with a location of a vertex of said rectangular-form mesh.

6. A method as described in claim 4, wherein said first corner point is associated with a final point associated with said drag gesture.

7. A method as described in claim 1, wherein said adjusting an edge curve associated with said nearest intermediate control point comprises:
   determining a touch-displacement distance;
   determining a touch-displacement direction; and
   adjusting a cubic Bezier curve associated with said edge curve by moving said nearest intermediate control point a distance corresponding to said touch-displacement distance in a direction corresponding to said touch-displacement direction.

8. A method as described in claim 1, wherein said correcting comprises an inverse projective transformation.

9. A method as described in claim 8, wherein said inverse projective transformation is applied in a fashion selected from the group consisting of a strip-by-strip fashion along a ruled direction in said edge-aligned mesh and a patch -by-patch fashion within said edge-aligned mesh.

10. A method as described in claim 9, further comprising subdividing any patch in said edge-aligned mesh wherein a surface curvature associated with said any patch exceeds a first threshold.

11. A method as described in claim 1 further comprising overlaying an intermediate corner-aligned mesh on said displayed document image in response to receiving each of said corner points in said plurality of corner points.

12. A method for correcting an image of a document page, said method comprising:
   displaying a document image on a touch-enabled-device display;
   overlaying a rectangular-form mesh on said displayed document image;
   receiving a plurality of corner points;
   overlaying a corner-aligned mesh on said displayed document image;
   receiving a touch displacement comprising an initial touch point and a final touch point;
   determining a nearest intermediate control point, wherein said nearest intermediate control point is an intermediate control point of an associated cubic Bezier curve, to said initial touch point;
   adjusting an edge curve associated with said nearest intermediate control point based on said touch displacement;
   generating an edge-aligned mesh based on said adjusted edge curve; and
   correcting a portion of said document image corresponding to said edge-aligned mesh.

13. A method as described in claim 12, wherein said corner-aligned mesh comprises a top edge and a bottom edge, wherein said top edge is a first cubic Bezier curve and said bottom edge is a second cubic Bezier curve.

14. A method as described in claim 13, wherein said edge curve is associated with one of said top edge and said bottom edge.

15. A method as described in claim 12, wherein receiving a first corner point in said plurality of corner points comprises:
   receiving a touch gesture in a gesture processor; and
   determining if said touch gesture is a drag gesture associated with a corner of said rectangular-form mesh.

16. A method as described in claim 15, wherein said determining if said touch gesture is a drag gesture associated with a corner of said rectangular-form mesh comprises comparing an initial point associated with said touch gesture with a location of a vertex of said rectangular-form mesh.

17. A method as described in claim 15, wherein said first corner point is associated with a final point associated with said drag gesture.

18. A method as described in claim 12, wherein said adjusting an edge curve associated with said nearest intermediate control point comprises:
   determining a touch-displacement distance;
   determining a touch-displacement direction; and
   adjusting a cubic Bezier curve associated with said edge curve by moving said nearest intermediate control point a distance corresponding to said touch-displacement distance in a direction corresponding to said touch-displacement direction.

19. A method as described in claim 12, further comprising subdividing any patch in said edge-aligned mesh wherein a surface curvature associated with said any patch exceeds a first threshold.

20. A method as described in claim 12 further comprising overlaying an intermediate corner-aligned mesh on said displayed document image in response to receiving each of said corner points in said plurality of corner points.

* * * * *